United States Patent [19]

Nicklasson et al.

[11] Patent Number: 4,768,622

[45] Date of Patent: Sep. 6, 1988

[54] BRAKE DEVICE WITH LEVER, CRANK, SPRING, AND ARM

[76] Inventors: Christer Nicklasson, P1 409, 430 16 Rolfstorp; Anders Wing, Hagaberg, Grimmared, 432 00 Varberg, both of Sweden

[21] Appl. No.: 24,118

[22] Filed: Mar. 10, 1987

[30] Foreign Application Priority Data

Mar. 20, 1986 [SE] Sweden ............................... 8601305

[51] Int. Cl.[4] ............................................. B60T 1/00

[52] U.S. Cl. ................................... 188/2 D; 188/29; 188/2 F; 280/33.99 C

[58] Field of Search ............. 188/29, 2 D, 2 F, 19–20, 188/21–23, 24.22, 24.12–24.21, 26, 28, 56, 57, 72.9, 9, 17, 74; 74/110, 501 R; 280/33.99 C, 242 WC, 289 WC

[56] References Cited

U.S. PATENT DOCUMENTS 2,591,524 4/1952 Douglas et al. ........................ 188/20
2,639,785 5/1953 Vickers ................................ 188/29
3,426,870 2/1969 Noland ................................. 188/29
4,391,352 7/1983 Brown ......................... 188/24.22 X
4,511,171 4/1985 Petersen ........................ 188/2 F X

FOREIGN PATENT DOCUMENTS 1394806 2/1964 France ................................. 188/29
1139796 7/1966 United Kingdom .................. 188/29

*Primary Examiner*—Douglas C. Butler
*Attorney, Agent, or Firm*—Beveridge, DeGrandi & Weilacher

[57] ABSTRACT

The present invention relates to a device for mounting a brake shoe (2) at a wheel (8) which is to be braked by the brake shoe (2), and for switching the brake shoe from a braking position to a release position, a lever (1) being mounted on a frame portion (7) in order to be pivotal about a mounting shaft (6) and carrying the brake shoe at its other end. A further arm (9) is moreover pivotal about the shaft (6) and carries a crank (10) at its opposing end, whose proximal end in relation to the brake shoe (2) is spring-connected to the lever (1), while the opposing end is connected to an operating member for the desired switching of the brake shoe (2).

6 Claims, 2 Drawing Sheets

BRAKE DEVICE WITH LEVER, CRANK, SPRING, AND ARM

TECHNICAL FIELD

The present invention relates to a device for mounting a brake shoe at a wheel which is to be braked by means of the brake shoe, and for switching the brake shoe from an engaged position braking the wheel and to a disengaged position releasing the wheel.

BACKGROUND ART

On many wheel-borne trolleys, chairs (wheelchairs) and small-scale vehicles, there is a need in this Art to provide some form of brake device for achieving securer and safer driving or transport. However, prior Art brake devices have not proved to lend themselves to mounting, without considerable modifications, on trolleys, chairs (wheelchairs) and small-scale vehicles which havenot already been adapted for this purpose on their manufacture. Sweeping modifications of this type often prove to occasion such prohibitively high costs that it is not deemed feasible to provide the finished product with a brake device, a lower standard of security and safety being instead tolerated in the handling of the trolley, chair (wheelchair) or small-scale vehicle. Thus, there is an urgent need in this Art for a brake device which is simple and reliable in both its construction and function and which is capable of being mounted on different models of trolleys, chairs (wheelchairs) and small-scale vehicles without their requiring any modification whatsoever.

OBJECT OF THE INVENTION

The object of satisfying the above-outlined needs forms the basis of the present invention.

SOLUTION

The object is solved according to the present invention in that the device disclosed by way of introduction is characterised in that a lever is mounted, with its one end, in a frame in which the wheel is rotatably disposed, the lever being pivotal about a first shaft which is fixedly disposed in the frame between the position braking the wheel and the position releasing the wheel, the other end of the lever carrying the brake shoe; and that a further arm is pivotal, at its one end, about the above-mentioned first shaft and carries, at the opposite end, a crank whose end located most proximal the brake shoe is spring-connected to the above-mentioned lever, while its other end is connected to one part of an operating cable whose other end is connected to the above-mentioned lever for realising the desired switching of the lever carrying the brake shoe between the position braking the wheel and the position releasing the wheel. The connection between the above-mentioned one end of the crank and the lever comprises a rod which is pivotally disposed on that one end, extends to the lever and is pivotally disposed thereon. The rod extends through a hole in the lever, the hole being larger than the rod such that the rod is freely movable in the hole. A spring is disposed on the rod and extends between an abutment on the rod and the lever. The movable part of the operating cable extends from the distal end of the rod in relation to the crank to an anchorage point on the lever between the hole for the rod and the mounting shaft of the lever. The mounting shaft is adjustably anchored in a mounting block which is pivotally and displaceably anchored on the end of the lever. The mounting shaft and the pivotal shaft of the mounting block intersect one another at an angle of substantially 90°. The mounting block is displaceable in the longitudinal direction of the lever.

As a result of the present invention, there will be realised an extremely simple and effective brake device which is, moreover, exceedingly simple to mount on many trolleys, chairs (wheelchairs) and small-scale vehicles without requiring any modification of the trolley, chair (wheelchair) or small-scale vehicle. The brake device according to the present invention has proved to be particularly advantageous for employment on different types of wheelchairs.

The brake device according to the present invention can be readily mounted on wheelchairs with both large and small diameter wheels. Moreover, the mounting operation can be carried out in such a manner as not to restrict in any way the collapsibility of the wheelchair. This highly versatile mounting facility on different types and models of wheelchairs is, above all, made possible in that the brake device has only a single mounting point at that wheel which is to be braked and is nevertheless adjustable within broad limits and about a plurality of shafts or axles.

BRIEF DESCRIPTION OF THE ACCOMPANYING DRAWINGS

The nature of the present invention and its aspects will be more readily understood from the following brief description of the accompanying Drawings, and discussion of one embodiment thereof with reference thereto.

DESCRIPTION OF PREFERRED EMBODIMENT

Figure 2:
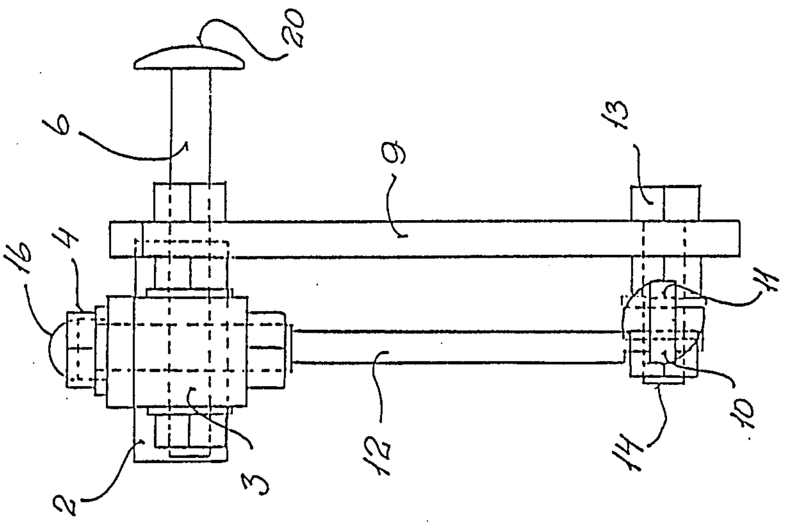
FIG. 2 is an end elevation of the embodiment of FIG. 1.

Referring to the Drawings, the embodiment shown therein of a device according to the present invention comprises a lever 1 with a brake shoe 2 at its one end and a mounting block 3 at the other end. The brake shoe 2 may be of different types and may be anchored in the end of the lever in a plurality of various ways. If it is desirable to be able to replace the brake shoe, this may appropriately be anchored in place using screws. Furthermore, the braking surface of the brake shoe is arched and may, naturally, be provided with a friction coating. In one prototype of the present invention, the brake shoe is manufactured of aluminum. The selection of aluminum as the material for the brake shoe 2 eliminates "break squeal" and other noises when the brake is applied.

The mounting block 3 is anchored to the end of the lever 1 by means of a through bolt 4, the aperture 5 in the end of the lever 1 being preferably elongate in order that the anchorage of the mounting block 3 on the end of the lever 1 may be adjustable. Transversely in relation to the bolt 4, there extends through the mounting block 3 a further bolt 6 which serves partly as a pivot shaft for the lever 1 and partly for mounting the entire brake device on a frame portion 7 at that wheel 8 which is to be braked, this being more clearly apparent from FIGS. 3 and 4.

There is further pivotally disposed on the shaft or bolt 6 an arm 9 whose opposite end is pivotally anchored substantially centrally on a crank 10. The one end of the crank 10 is turned through 90° and is provided with a hole 11, while its opposite end is pivotally connected to the end of a rod 12. The pivotal anchorages or connections with the crank 10 are realised by means of bolts 13 and 14, respectively. The distal end of the rod 12 in relation to the crank 10 extends through a hole 15 in the lever 1 and the free end of the rod 12 is provided with an acorn nut 16. A compression spring 18 is disposed on the rod 12 between an abutment 17 on the rod 12 and the lever 1. There is a relatively large degree of play between the hole 15 in the lever 1 and the rod 12, so that the rod 12 may 'rock' in the hole 15. In the proximity of the hole 15, there is a further hole 19 through the lever 1.

The holes 11 and 19 are each intended for their part of a per se conventional operating cable, the outer casing of the operating cable extending between the hole 11 and a fixed portion of an operating handle. The one end of the cable running within the outer casing is to be anchored in the hole 19, while the opposite end is to be anchored in the movable portion of the operating handle, so that the distance between holes 11 and 19 is reduced when the handle is pushed in towards a substrate and when it is desirable to move the brake shoe 2 into abutment against the wheel 8. When the handle is released, the spring 18 and the rod 12 will return the brake shoe 2, and thereby also the lever 1, to the initial position illustrated on the Drawings.

Figure 1:
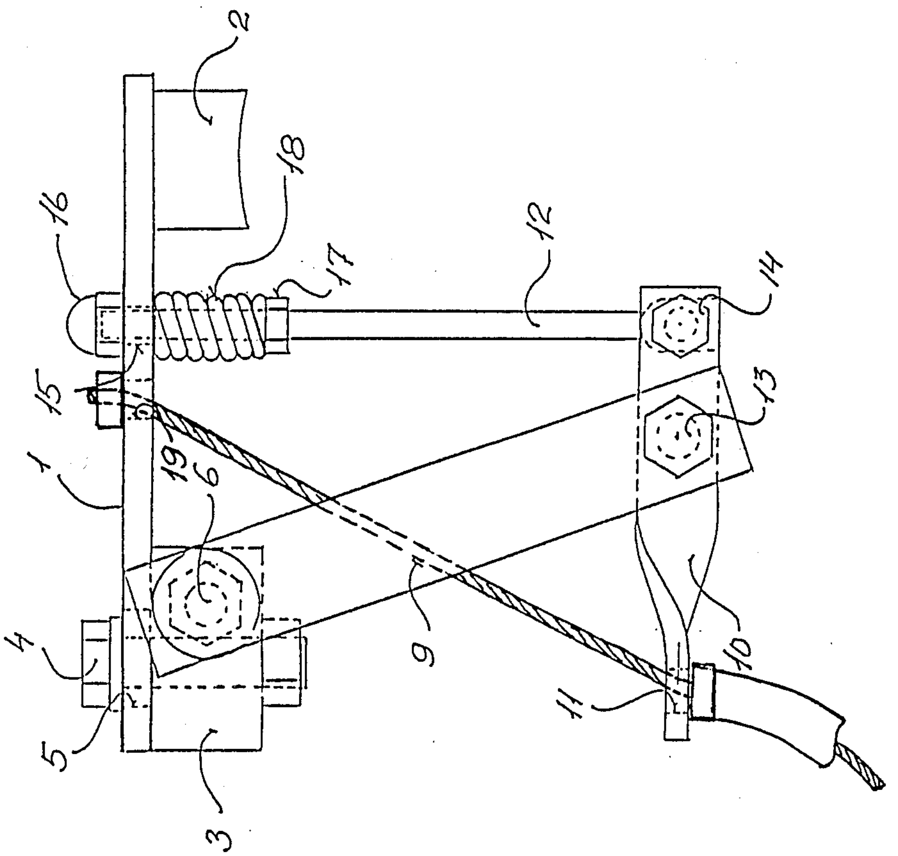
FIG. 1 is a side elevation of one embodiment of a brake device according to the present invention.

When the operating cable is activated, the lever 1 pivots on the shaft 6 to apply the brake shoe 2 against the wheel. The casing of the operating cable bears against the crank 10 to move the crank in a clockwise direction about the bolt 13 as seen in FIG. 1. This causes the rod 12 to pull the lever 1 in a brake-applying direction. When the operating cable is released, the brake is released and the components return to their inactive positions shown in FIG. 1.

Figure 4:
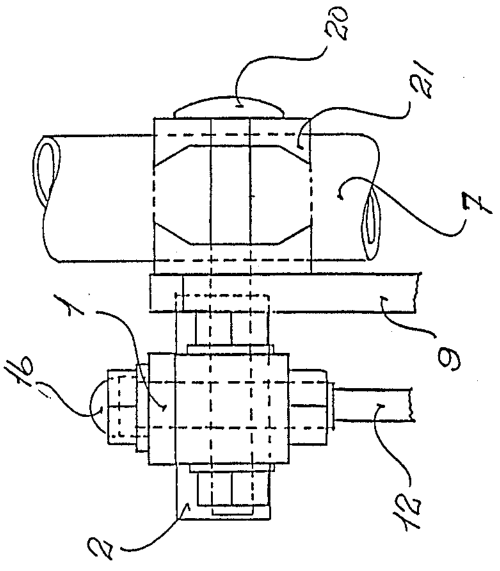
FIG. 4 illustrates a similar part to that of FIG. 3 of the end elevation of FIG. 2 with the mounting detail shown in FIG. 3.
Figure 3:
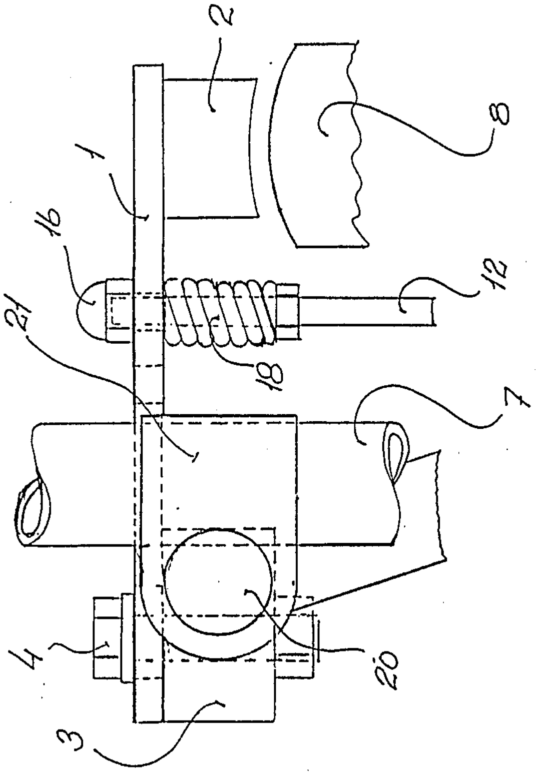
FIG. 3 illustrates a part of the side elevation of FIG. 1 with a mounting detail.

FIGS. 3 and 4 demonstrate more clearly how the brake device illustrated in FIGS. 1 and 2 may be mounted to a wheel 8 which is to be braked by means of the brake shoe 2. In the illustrated and discussed embodiment, a so-called tube clamp 21 (which may be of the same type as is used for mounting cycle saddles) is disposed on the bolt 6 between its head 20 and the arm 9.

As will be clearly apparent from FIGS. 3 and 4, there is considerable leeway for setting and adjustment. The clamp 21 may be readily pivoted on the bolt 6 for adjusting the play between the brake shoe 2 and the peripheral surface of the wheel 8. Furthermore, the point of engagement of the brake shoe 2 on the peripheral surface of the wheel 8 can be governed with the assistance of the bolt 4 and the elongate aperture 5 extending in the longitudinal direction of the lever 1. In this instance, it may also be appropriate to utilise the possibility for pivoting the lever 1 about the bolt 4 at the same time as the position in the aperture 5 is gauged and set. A further adjustment possibility resides in the optional positioning of the brake shoe 2 on the end of the lever 1. Hence, there are considerable possibilities for adjustment and setting in conjunction with mounting of the device according to the present invention at a wheel which is to be braked.

Moreover, the device according to the present invention may readily be modified to make for operation by nursing staff in charge of the wheelchair and/or by the patient seated in the wheelchair. Handles may be provided for both the nurse and the patient for operating the brake device to engage or disengage the wheel or wheels. The handles may be of the same type as employed for cycle brakes. In such an event, the crank 10 is modified with, for instance, two holes 11 each for their cable outer casing, while the hole 19 in the lever 1 is intended for a double cable nipple. The operating handles are placed at suitable points on the wheelchair and my be designed—and possibly lengthened—in order to facilitate switching operations executed by the patient.

The present invention should not be considered as restricted to that described above and shown on the Drawings, many modifications being conceivable without departing from the spirit and scope of the appended Claims.

We claim:

1. A device for mounting a brake shoe for movement between a position where it brakes a wheel and a position where it is released from said wheel, a first shaft, a lever having one end pivoted on said first shaft for movement between a position braking the wheel and a position releasing the wheel, said lever having another end which carries a brake shoe, said device having a further arm which has one end pivoted on said first shaft and an opposite end which carries a crank, said crank having first and second ends which are on opposite sides of said opposite end of said further arm, a rod pivotally mounted on the first end of the crank which is most proximate to the brake shoe, an abutment on the rod, a spring disposed on the rod and extending between said abutment and the lever, said rod extending to the lever and being connected thereto, an operating cable having one part connected to the crank and another part connected to the lever whereby actuation of the operating cable switches the lever which carries the brake shoe between the position where it brakes the wheel and the position where it releases the wheel.

2. The device as claimed in claim 1 wherein the rod extends through a hole in the lever, said hole being larger than the rod so that the rod is freely movable in the hole.

3. The device as claimed in claim 2 wherein the operating cable has a movable part which extends from the end of the crank to an anchorage point on the lever which lies between the hole for the rod and said first shaft.

4. The device as claimed in claim 1 having a mounting block which is pivotally and displaceably anchored on an end of the lever, said first shaft being adjustably anchored in said mounting block.

5. The device as claimed in claim 4 wherein the mounting block is mounted on a pivotal shaft which intersect the first shaft at an angle of substantially 90 degrees.

6. The device as claimed in claim 4 wherein the mounting block is displaceable in the longitudinal direction of the lever.

* * * * *